(12) United States Patent  (10) Patent No.: US 8,727,362 B2
Heimann et al.  (45) Date of Patent: May 20, 2014

(54) WHEEL SUSPENSION ELEMENT COMPRISING AT LEAST A SUPPORTING STRUCTURE AND A ROD

(75) Inventors: Jens Heimann, Stetten (DE); Daniel Wolf, Friedrichshafen (DE); Thomas Eifflaender, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 10 days.

(21) Appl. No.: 13/487,365

(22) Filed: Jun. 4, 2012

(65) Prior Publication Data

US 2012/0313339 A1  Dec. 13, 2012

(30) Foreign Application Priority Data

Jun. 10, 2011  (DE) .......................... 10 2011 077 336

(51) Int. Cl.
    *B60G 3/10*  (2006.01)
(52) U.S. Cl.
    USPC .............................. 280/124.134; 280/124.14
(58) Field of Classification Search
    USPC ........................ 280/124.163, 124.134, 124.17
    See application file for complete search history.

(56) References Cited

U.S. PATENT DOCUMENTS

| | | | | |
|---|---|---|---|---|
| 1,499,675 A * | 7/1924 | McDougal | ............. | 280/124.113 |
| 2,873,980 A * | 2/1959 | Thomas et al. | ......... | 280/124.134 |
| 3,002,742 A * | 10/1961 | Troy | ................. | 267/38 |
| 3,806,151 A * | 4/1974 | Prasniewski | ........... | 280/124.113 |
| 4,557,500 A | 12/1985 | Collard et al. | | |
| 4,753,456 A * | 6/1988 | Booher | .................. | 280/124.134 |
| 4,861,067 A * | 8/1989 | Booher | ........................ | 280/5.515 |
| 4,867,474 A * | 9/1989 | Smith | ........................ | 280/5.507 |
| 4,893,832 A * | 1/1990 | Booher | .................. | 280/124.146 |
| 5,267,751 A * | 12/1993 | Hiromoto et al. | ...... | 280/124.151 |
| 5,382,034 A * | 1/1995 | Parker et al. | ................... | 280/104 |
| 5,556,081 A * | 9/1996 | Miura et al. | .................... | 267/47 |
| 6,073,991 A | 6/2000 | Naert | | |
| 6,149,198 A * | 11/2000 | Klaas | ............................. | 280/798 |
| 6,152,433 A | 11/2000 | Hettich et al. | | |
| 6,189,904 B1 * | 2/2001 | Gentry et al. | .......... | 280/124.175 |
| 6,457,729 B2 | 10/2002 | Stenvall | | |
| 6,530,587 B2 * | 3/2003 | Lawson et al. | ........... | 280/124.17 |
| 6,612,593 B2 * | 9/2003 | Mikasa et al. | ........... | 280/86.758 |
| 6,616,159 B2 * | 9/2003 | Lawson | .................. | 280/124.135 |
| 6,659,482 B2 * | 12/2003 | Carlstedt et al. | ......... | 280/124.14 |
| 6,811,169 B2 * | 11/2004 | Schroeder et al. | ...... | 280/124.171 |
| 7,159,880 B2 * | 1/2007 | Budde et al. | ........... | 280/124.128 |
| 7,216,860 B2 * | 5/2007 | Budde et al. | .................. | 267/188 |
| 7,246,808 B2 * | 7/2007 | Preijert | .................... | 280/124.17 |
| 7,938,414 B2 * | 5/2011 | Buschjohann et al. | | 280/124.109 |
| 2002/0000703 A1 * | 1/2002 | Lawson et al. | ............. | 280/124.1 |

(Continued)

FOREIGN PATENT DOCUMENTS

DE  32 43 434 A1  5/1985
DE  4110553 A1 * 10/1992 ............. B62D 25/08

(Continued)

*Primary Examiner* — Nicole Verley
(74) *Attorney, Agent, or Firm* — Davis & Bujold, PLLC; Michael J. Bujold

(57) ABSTRACT

A wheel suspension element for a motor vehicle which comprises a supporting structure (1) for an axle of a motor vehicle and at least a rod for guiding, with the rod, at least an articulated wheel carrier (2) which can be connected to the supporting structure (1). The supporting structure (1) is formed from a fiber composite material. The rod of the wheel suspension element is designed as an elastic spring rod (3, 4) and is formed from a fiber composite material as one element with the supporting structure (1).

18 Claims, 2 Drawing Sheets

(56) References Cited

U.S. PATENT DOCUMENTS

2006/0113744 A1 * 6/2006 Preijert .................. 280/124.163

FOREIGN PATENT DOCUMENTS

| | | |
|---|---|---|
| DE | 197 38 249 A1 | 3/1999 |
| DE | 197 50 225 A1 | 5/1999 |
| DE | 695 22 950 T2 | 8/2002 |
| DE | 601 19 216 T2 | 2/2007 |
| DE | 10 2009 002 939 A1 | 11/2010 |
| FR | 2 516 455 | 5/1983 |
| FR | 2 926 248 A1 | 7/2009 |
| JP | 03135812 A * | 6/1991 ............ B60G 17/02 |

* cited by examiner

WHEEL SUSPENSION ELEMENT COMPRISING AT LEAST A SUPPORTING STRUCTURE AND A ROD

This application claims priority from German patent application Ser. No. 10 2011 077 336.3 filed Jun. 10, 2011.

FIELD OF THE INVENTION

The present invention concerns a wheel suspension element for a motor vehicle, comprising a supporting structure for an axle and at least one rod for the guidance of an articulated wheel carrier which is attachable by means of the rod to the supporting structure, were the supporting structure is at least partially formed with fiber composite material.

BACKGROUND OF THE INVENTION

The automobile industry searches increasingly for possibilities of providing vehicle parts having a lower weight but at the same time favorable production costs, and having improved or at least equivalent characteristics.

Known from DE 695 22 950 T3 is a supporting structure for use in vehicle bodies. This supporting structure creates an auxiliary frame and can be designed with fiber composite material, whereby its stiffness can vary locally. An additional spring part is provided for absorbing movements of the wheel carrier. The spring part requires a costly way in regard to the connection with the auxiliary frame or the supporting structure, respectively.

SUMMARY OF THE INVENTION

The present invention has the task to enhance the design of a wheel suspension element so that the wheel suspension element has a less complex design in comparison with the state of the art, and which can be manufactured accordingly at a lower cost, can easily be installed, and which can easily be exchanged.

The inventive wheel suspension element comprises a supporting structure for an axle of the motor vehicle and at least one rod for the guidance of a wheel carrier which is attachable to the supporting structure. The supporting structure is formed at least partially with a fiber composite material. The inventive wheel suspension element is further characterized by the fact that the rod is formed as an elastic, single piece spring rod, and together with the supporting structure, using a fiber composite material.

Thus, the inventive wheel suspension element provides a rod which is designed as an elastic spring rod. It has the purpose to guide the wheel carrier and to counteract a compression and/or decompression of the wheel, which corresponds to an up or down movement of the wheels, perpendicular to the driving direction of the motor vehicle, through the creation of a spring load. In addition, the rod is designed as one-piece together with the supporting structure so that the rod is integrated with the supporting structure. The one-piece, integral combination of the supporting structure and rod simplifies the manufacturing, maintenance, and mounting of the wheel suspension element, because, due to the integration of the supporting structure and the rod, altogether fewer parts are required as compared to the known state of the art. This fact simplifies the mounting of the wheel suspension—as already mentioned—and results in a lower total cost of the wheel suspension element.

In addition, the wheel suspension element is, in accordance with the invention, at least partially formed with a fiber composite material which has the advantage of a favorable ratio between ruggedness, stress capacity, and weight. Thus, heavy parts can be omitted due to the same ruggedness or rather stress capacity. Also, the fiber composite material has the advantage that the content of the part can be tailored with regard to specific requirements of the part, for instance the selection of the material and the fiber layers or the amount of fiber, respectively.

Preferably, the spring rod can be is designed on both sides symmetrically in reference to the carrier structure and accordingly serves with its available, distal ends for a connection to different wheel carriers at different sides of the motor vehicle. In this case, one and the same spring rod can have two connection sides, corresponding with the two sides of the motor vehicle and the provided wheel carriers, which will be explained in more detail further down.

A further, advantageous embodiment of the inventive wheel suspension element is designed in a way that at least two spring rods, constructed as one piece with the supporting structure and based on fiber compound material, are provided at the connection side for the wheel carrier. The installation of several rods at a connection side of the spring rods to the wheel carrier improves the guidance effect of the rod with the wheel carrier. In addition, the force increases through the positioning of several rods at the connection side which counteract the spring compression movement and/or decompression movement of the wheels.

Another advantageous, further embodiment provides that the spring rod is designed, at the connection area of the wheel carrier, in a way so that it is more flexible in the spring compression and/or decompression direction (z) than the herewith perpendicular spatial directions (x, y). Thus, the spring rod varies in its stiffness depending on the acting force at the rod and its direction. In the spring compression or spring decompression direction, which relates in general to an up or down movement of the wheels and perpendicular to the driving direction of the vehicle, the stiffness of the spring rod in the connection area of the wheel carrier is therefore less pronounced than in the other spatial directions. The stiffness of the spring rod can be influenced especially through the design of its profile cross section or the surface moment of inertia.

In a preferred, further embodiment of the inventive wheel suspension element, the spring rod is designed in the transition region of the support structure in a manner such that the spring rod is stiffer in the spring compression and/or decompression direction (z) than in a horizontal direction (x), preferably and in particular a direction which is in parallel to the driving direction of the motor vehicle. In the transition region of the supporting structure, which can be the area that is particularly centrally located between the connecting sides of the two-sided symmetrical spring rod, as further explained above, the spring rod is therefore designed stiffer in accord with the above defined spring compression or decompression direction, respectively, to guarantee the required stability. The spring rod can therefore well elastically deform itself in the area of its free end or free ends, respectively, meaning at its connecting ends due to their flexibility, contrary to the transition region towards the supporting structure where it is less easily deformable and where it contributes to the stability of the entire configuration.

As a person skilled in the art can recognize that the present invention is not limited to rods or spring rods with a certain number of free ends or connecting sides. It is therefore possible in the context of the present invention, to provide a certain spring rod based on the supporting structure, which extends to a connecting side (for a wheel carrier). It is also possible in this sense of the invention, based on the supporting structure, to provide several of such rods at a site of the supporting structure and/or to design a rod or rods, in a way that they extend at one side of the supporting structure up to the opposite side of the supporting structure.

As an advantage, in the context of another embodiment of the invention, a continuous change of the aspect ratio is provided in the transition area of at least one spring rod towards the supporting structure. The term "aspect ratio" is here to be understood as the ratio of the depth or height of a structure—in here the rod or spring rod—to its (smallest) lateral extension. In the context of the present invention, it can therefore also be provided that the above defined aspect ratio for the rod at its distal end, in the direction of the supporting structure, meaning from the outside to the inside, preferably and continuously increases. In other words, the extension of the rod in the direction of its height increases relatively to the width of the rod. Hereby, the height of the rod extends preferably and in particular in parallel to the spring compression or decompression direction (z-direction), while the width of the rod is particularly perpendicular thereto, meaning approximately situated in the driving direction of the motor vehicle (x-direction). Such a change of the aspect ratio matches the stiffness over the entire wheel suspension element individually to the load conditions. The stiffness of the wheel suspension element, especially in the area of the rod, can in this case be influenced by the design of the profile cross section or area moment of inertia, respectively.

The described change of the aspect ratio enables the advantage of a creation—from the outside to the inside—of an increasingly flexible profile, which increases the stiffness in the z-direction but increases the flexibility in the x-direction, that guarantees a longitudinal flexibility (skewed suspension) of the vehicle axis. The ratio of the height and the width can in this case especially be reversed.

Another advantageous further embodiment of the inventive wheel suspension provides that the combined spring rods at the connection side are positioned in the spring compression or spring decompression direction (z), respectively, and in addition preferably horizontal, and highly preferable in particular in the driving direction (x), positioned with an offset. Hereby, the inventive wheel suspension element can match the individual occurring loads and can also match the available space for the wheel suspension.

Another embodiment of the inventive wheel suspension is characterized by an additional and different spring element, that is configured as separate from the supporting structure and the rod, which can be designed like a transverse leaf spring. Also, this spring element can be positioned between two spring rods which are mounted at a common connection side. These particular embodiments of the inventive wheel suspension element have been already mentioned earlier in detail in previous paragraphs. The spring element or the transverse leaf spring provides for each application or type of vehicle, respectively, an additional and matched spring effect.

Advantageously, the inventive wheel suspension element has, in a respective further embodiment, at least one bearing point for the spring element or the transverse leaf spring in a central area of the supporting structure, where this central area can at least partially coincide with the already mentioned transition area. As an advantage, the bearing point defines in particular a rotational axis, parallel to the driving direction, for the spring element or the transverse leaf spring.

A preferred further embodiment of the inventive wheel suspension element is characterized by the fact that the spring rod and the supporting structure have at least one continuous fiber layer and/or have the same matrix material. The fibers can be locally oriented differently and can have different layer amounts. Also the kind of fibers, as for instance its material, thickness, or length can vary. Different conditions of the composition can hereby be locally accomplished.

Without limitation, for instance for the manufacturing of the wheel suspension elements and the application of thermosetting plastics in accordance with the prepreg method, flat sheets can be used to cut or stamp the applied profiles from pre-impregnated fiber layers and then be piled. The fibers can hereby have a locally different orientation and can have a different number of layers.

As an alternative, the RTM or RIM (Resin Transfer/Injection Molding) method can be applied in which fiber layers are cut out and are sprayed with a binding powder so that they are stable, after the textile preforming of the structure. In addition, the textile pre-form can be sewed or stapled, to further create a fixing effect or to influence the fiber structure. Thereafter, the fiber pre-form is put into a form and is impregnated. A single or multi-side film gate is used for the impregnation which extends preferably over the (entire) width of the part. The variation hereby can be the use of pinpoint gating in the center of the supporting structure, wherein film gates can also be positioned in the transitional area of the spring rods.

In the case of thermoplastic matrix systems (SMC or BMC), preferably the use of semifinished products are provided which are put into the tool and are pressed thereafter so as to adopt the respective contour. Such thermoplastic matrix systems, such as fiberglass, can be strengthened with long fibers of up to two inches.

However, the use of long fibers or glass mat strengthened thermoplastics is preferred with thermoplastic matrix systems. Glass mat strengthened thermoplastics can be combined with long fiber strengthened thermoplastics or textile strengthened thermoplastics.

An especially advantageous further embodiment of the inventive wheel suspension elements provides that a relatively stiff central area is formed therein for connection to the bottom of the body of a motor vehicle and/or that at least an additional, formed body carrier is provided for an outer connection to a longitudinal carrier of the vehicle body, starting at the central area, wherein preferably the central area at least partially overlaps the previously mentioned transition area. A stiff central area in reference to the rod increases the stability of the connecting areas to the body because the central area does not sustainably deform due to its stiffness.

As an advantage, the additionally formed body carrier can be designed as a fiber composite, an extruded profile, or a steel profile, and especially as a completely, separately constructed profile part. This allows high variability of the material and a good match with the environmental or load conditions, respectively. Especially the designed profiles of the body carrier allows a savings of weight and therefore a reduction of the total weight of the wheel suspension element or the complete vehicle.

An especially advantageous further embodiment of the inventive wheel suspension element comprises at least a polymer joint which is integrated into the spring rod, for instance a rubber joint, especially in the distal end area of the spring rod, as a rotation elastic bearing of the wheel carrier. The integration of a polymer joint, which can for instance be designed into the spring rod with an elastomeric, a special plastic, rubber or similar, allows for the omission of additional connecting parts or bearing parts and allows further simplification of manufacturing and installation. The elimination of additional parts reduces the cost of the wheel suspension element, especially the costs associated with installation.

As an advantage, a respective further embodiment has at least a polymer joint integrated in the transverse leaf spring, especially in the distal end area of the spring element or the transverse leaf spring, to achieve a rotational elastic bearing of the wheel carrier. The transverse leaf spring and the rod can hereby, in the respective distal end areas, be provided with the respective bearing shoe and can be rotationally, elastically positioned at the wheel carrier. The polymer joint can for instance be designed as a rubber-sleeve joint. When integrating such joints, especially rubber-sleeve joints in the carrier structure or rod ends there exists the additional possibility of completely omitting the regularly present metal sleeve, which serves, in accordance with the state of the art, to press-fit the mentioned sleeve joints. The rubber, elastomeric, or similar is then directly injected in a respective bore hole in the carrier structure or at the end of the rod and there vulcanized accordingly. In the sense of the above mentioned thermoplastic or duroplastic manufacturing processes, synchronized manufacturing of elastomeric and rubber for the production of the mentioned polymer joints is possible.

In accordance with the previous description, an additional embodiment of the inventive wheel suspension element provides that the carrier structure has at least one recess and the polymer joint is positioned in that recess. Thus, a (metal) sleeve can be omitted which surrounds the polymer joint, because the polymer, elastomeric, or rubber can be injected or vulcanized directly into the mentioned recess.

As an advantage, the carrier structure is provided with brackets, mounting elements and/or inserts to accommodate cable harnesses, brake hoses, and/or heat protection sheet metal. This allows a very compact configuration of the complete wheel suspension with the addition of the parts to the inventive wheel suspension element.

Another different further embodiment of the inventive wheel suspension element is characterized by the fact that the spring rod and the carrier structure are manufactured in the same manufacturing step. This allows a respective simplification of the manufacturing process and therefore reduces the incurred cost for the wheel suspension element.

BRIEF DESCRIPTION OF THE DRAWINGS

Additional advantages and characteristics of the inventive wheel suspension element are explained through the embodiment examples and the drawings. Hereby shown are.

DETAILED DESCRIPTION OF THE PREFERRED EMBODIMENTS

Figure 1:
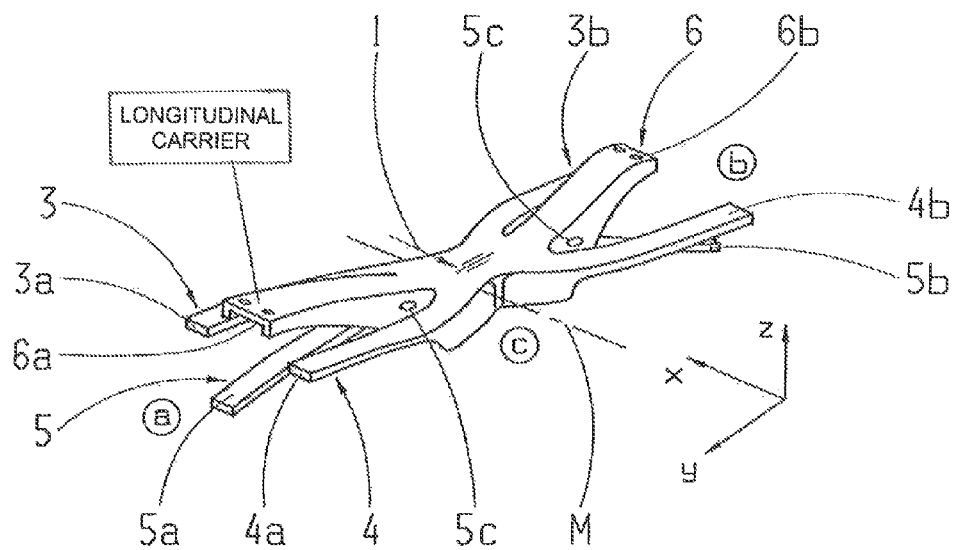
FIG. 1 a first embodiment of the inventive wheel suspension element.

FIG. 1 shows a first embodiment of the inventive wheel suspension element for a motor vehicle. The presented wheel suspension element comprises of a supporting structure 1 and an integrated spring rod 3, 4. The spring rod 3, 4 is connected to or designed as one piece with the supporting structure 1 and the complete configuration is manufactured with a plastic-fiber composite material.

Figure 2:
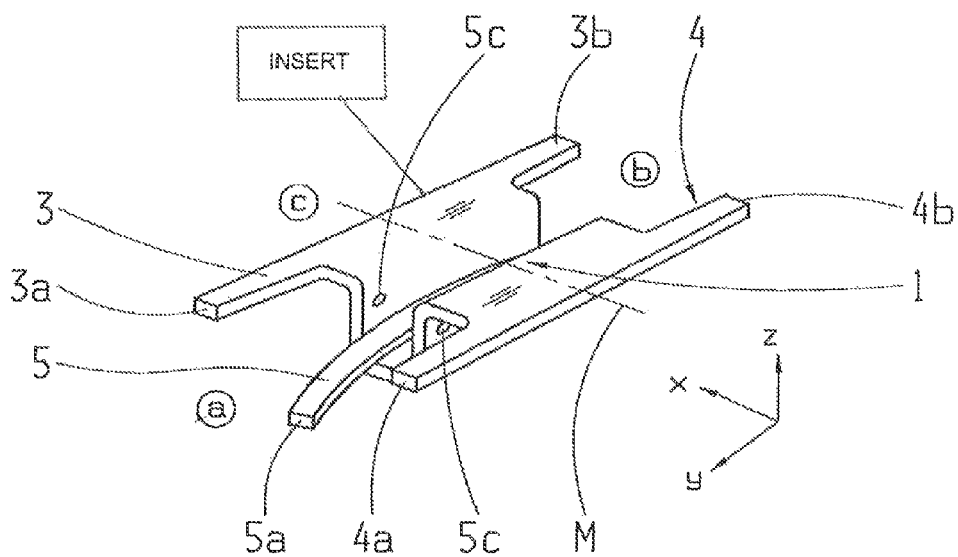
FIG. 2 a second embodiment of the inventive wheel suspension element.

The presented configuration in FIG. 2 is symmetrically designed in relation to a plane which extends in a z-direction of a drawn coordinate system and which has the center axis M drawn as a dotted line. The center axis M extends parallel to the x-axis of the drawn coordinate system. Accordingly, the spring rods 3, 4 each have rod ends 3a, 4a, or 3b, 4b located on each side of the center axis M. These sides have been marked in FIG. 1 with the reference characters a or b, respectively, and are referred to as "connecting sides" because a wheel carrier of the motor vehicle is here connected or can be connected as will be explained in more detail further down with FIG. 3. In accordance with the illustration in FIG. 1, the spring rods 3, 4, as well as the supporting structure 1, extend mainly in the x-y-plane of the drawing, wherein the x-direction substantially coincides with the drive direction of a not shown motor vehicle in which the inventive wheel suspension element is applied. The z-direction is perpendicular in relationship to the mentioned x-y-plane and substantially coincides with any moving direction in which a wheel carrier (see FIG. 3) would perform, which is positioned at the ends 3a, 3b, 4a, 4b of the spring rod, during spring compression or spring decompression movement.

Between the two spring rods 3, 4, is an additional molded carrier 6 which is positioned such that it's free ends 6a, 6b, extend on both sides of the center axis M, towards the connecting sides a, b and which also has an extension component that extends in the z-direction. The additional, form-shaped carrier 6 has a U-profile. It is also in the context of the invention to provide the additional, form-shaped area 6 with a different profile. With its free ends 6a or 6b the carrier 6 extends, in reference to the center axis M, approximately as far in the +y-direction or –y-direction, respectively, as the spring rod 3, 4.

As previously mentioned, the carrier 6 is preferably different from the remaining wheel suspension element, a separately manufactured profile made of a fiber composite, which can be an extrusion profile or a steel profile which is a separate design and which is thereafter mounted at the wheel suspension element in the area of the supporting structure 1. Basically, in the context of the invention, the carrier 6 is manufactured together with the supporting structure 1 and the spring rods 3, 4 in a common manufacturing process and/or with a common or similar material.

The spring rods 3, 4 extend—as already previously presented—mainly in the x-y-plane and have, starting at the supporting structure 1, a slightly curved structure. To the contrary, the carrier 6 extends with its ends 6a, 6b mainly in the y-z-plane and has in regard to this plane the slightly curved structure which is shown in FIG. 1. The U-profile of the carriers 6, in accordance with the illustration in FIG. 1, open at the bottom, meaning in the direction of the –z-axis.

Between the connecting sides a, b in the area of the supporting structure 1, a so-called central area c is defined near the already mentioned center line M. The wheel carrier element comprises, in this central area c, bearing locations 5c for bearing a spring element which is formed as a transverse leaf spring 5, where this transverse leaf spring 5, like the rods 3, 4 and the carrier 6, has two free ends or connection areas 5a, 5b, where one of the same is positioned on each side a, b with reference to the centerline M. The bearing locations 5c, only two of which can be seen in the visible front side of the carriers 6 due to the drawing technique, define a rotational axis or bending axis for the transverse leaf spring 5 and the axis runs here in the x-direction and is therefore mainly following as parallel to the driving direction. The mentioned axes favor or allow spring movement of the transverse leaf spring 5 in the area of its free ends 5a, 5b, mainly in the z-direction.

FIG. 2 shows a second embodiment of the inventive wheel suspension element which has mainly the same functionality as the embodiment in FIG. 1. Therefore, the same reference characters mark the same or the functionality same parts in FIG. 1 and FIG. 2.

At this stage, just the main differences between the two wheel carrier elements in accordance with FIG. 1 and FIG. 2 are described:

In accordance with the illustration of FIG. 2, the spring rods 3, 4 run mainly straight in the y-axis direction of the drawn coordinate system. They have a formed shape at the support structure 1 in the central area c which is designed like an upward, open U-profile, meaning in the direction of the +z-axis. A transverse leaf spring 5 is positioned in the inner part of the supporting structure 1 or the U-profile and is again spring mounted at the position identified by reference character 5c. A form shaped carrier 6 (compare FIG. 1) is not present in this embodiment in FIG. 2.

The flanges on the side of the supporting structure 1, which extend upward in the +z-direction, are especially bent at an angle to the side and parallel to the x-y-plane, and the spring rods 3, 4 are formed with these flanges, so that a top view of the wheel carrier part, in accordance with FIG. 2, creates with the support structure 1 and the spring rods 3, 4 an H-shaped look.

Figure 3:
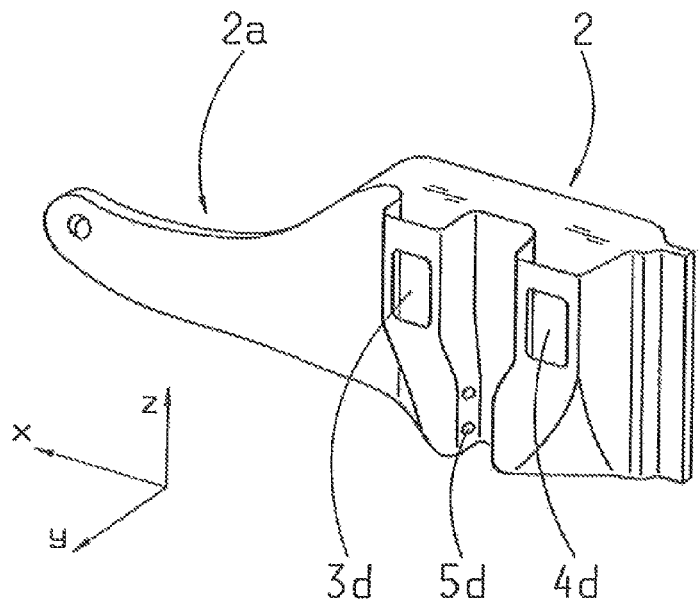
FIG. 3 shows a wheel carrier which is designed to work in conjunction with the inventive wheel suspension element in accordance with FIG. 1 and FIG. 2.

FIG. 3 shows a wheel carrier 2 which can be connected especially by means of the presented wheel carrier parts as in FIG. 1 and FIG. 2. The illustrated example of the wheel carrier 2 in FIG. 3 has—without limitation—an integrated longitudinal rod or a strut 2a, however the use of such wheel carriers are not mandatory regarding the context of this present invention.

Referring to the reference characters 3d, 4d, and 5d in accordance with FIG. 3, the wheel carrier 2 has appropriate bearing devices, in which or at which, the inventive wheel carrier part with the related free ends 3a, 3b, 4a, 4b of the spring rod 3, 4, or the free ends 5a, 5b of the transverse leaf spring 5, is rotationally elastically positioned or can be positioned.

The ends of the rod 3a, 3b, 4a, 4b, and the ends of the transverse leaf spring 5a, 5b are equipped with the respective, complementary bearing shoes (not shown) and are rotationally, elastically positioned in a wheel carrier 2 at the position 3d, 4d, 5d.

The spring rods 3, 4 have a profile and/or are designed in regard to the area moments of inertia in a way such that they are highly flexible in the z-direction at the ends of the rod 3a, 3b, 4a, 4b. An elastic deformation of the ends of the rod 3a, 3b, 4a, 4b, in the z-direction is therefore allowed or desired, respectively.

However, in the central area c, the supporting structure 1 is designed as stiff in the z-direction. Thus, it is at this section not elastic and provides the central area c with the required stability. The central area c serves as the connection point with a not shown bottom of the body. As an alternative, the body can also in addition be connected through the formed carrier 6 as in FIG. 1 with the supporting structure 1.

Figure 4:
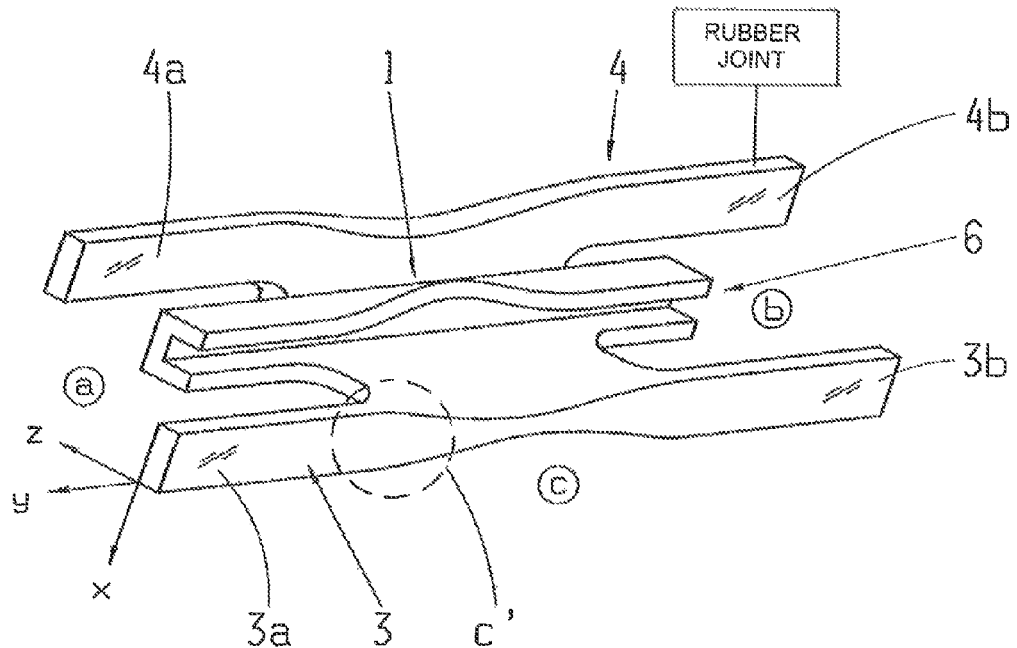
FIG. 4 shows an additional embodiment of the inventive wheel suspension element.

FIG. 4 illustrates an additional, alternative embodiment of the inventive wheel suspension element. Only the main differences to FIGS. 1 and 2 will be mentioned in detail; the same reference characters relate to each other.

The spring rods 3, 4 are, in accordance with FIG. 4, designed in such a way that facilitates longitudinal flexibility, which is needed for an inclined suspension of the spring rods in the x-direction (driving direction). For this purpose, the aspect ratio changes in relation to the height of the spring rods 3, 4 (in the z-direction) and its width (in the x-direction), depending on the y-coordinate along the spring rod (small aspect ratio in the connecting area a, b, or large aspect ratio in the central area c, respectively). In accordance with the drawing in FIG. 4, the aspect ratio changes continuously, starting at the connecting areas a, b in the direction of the central area c, so that a pronounced longitudinal flexibility of the wheel carrier element occurs in the area c and in particular in the intermediate area c' which enables the desired inclined suspension effect.

In accordance with FIG. 4, the present carrier 6 in turn is designed as a U-shape profile. It can be preferably constructed from a separate profile such as a fiber composite, as an extrusion profile, or as a steel profile and can be mounted to the remaining wheel carrier element in the area of the supporting structure 1. As an alternative, materials can be applied which are manufactured by means of injection molding or impact extrusion processes.

The wheel carrier element in accordance with FIG. 4 can also have, preferably in the inside of the U-profile carrier 6, another spring element, in the art of a transverse leaf spring which has been described further above based on FIGS. 1 and 2.

The wheel carrier element in accordance with FIG. 4 interacts in the same way with the wheel carrier elements in FIGS. 1 and 2 and with the wheel carrier 2 in FIG. 3, so that an additional description is here not necessary.

Reference Characters

1 Supporting Structure
2 Wheel Carrier
3 Spring Rod
3a Spring Rod end
3b Spring Rod end
4 Spring Rod
4a Spring Rod end
4b Spring Rod end
4d Bearing device
5 Transverse Leaf Spring
5a Transverse leaf spring end
5b Transverse leaf spring end
5c Bearing point
5d Bearing device
6 Carrier
6a Carrier end
6b Carrier end
a Connection side
b Connection side
c Central area
x Spatial direction (driving direction)
y Spatial direction
z Spatial direction (spring compression/decompression direction)

The invention claimed is:

1. A wheel suspension element for a motor vehicle, the wheel suspension element comprising:
   a supporting structure (1) for an axle,
   two spring rods having opposite ends, each of which couples an articulated wheel carrier (2),
   the two spring rods couple the wheel carrier (2) to the supporting structure (1),
   the supporting structure (1) being formed at least partially from a fiber composite material,
   the two spring rods being elastic spring rods (3, 4) that are formed, from the fiber composite material, as one piece with the supporting structure (1), two spring rods (3, 4) have connection sides (a, b) to which the wheel carrier (2) is connected, and the two spring rods (3, 4) are formed from the fiber composite material as one piece, and the two spring rods (3, 4), which are positioned together at a connection side (a, b), are offset in at least one of a spring compression and a spring decompression direction (z) but are horizontal in a driving direction (x).

2. The wheel suspension element according to claim 1, wherein the two spring rods (3, 4) comprise connection areas (3a, 3b, 4a, 4b) which are connected to the wheel carrier (2), the two spring rods are more flexible in a first axis, which extends in at least one of the spring compression and the spring decompression direction (z), than in second and third axes which extend in spatial directions (x, y) perpendicular to the first axis, the second axis extends in the driving direction of the motor vehicle and the third axis extends laterally in relation to the driving direction of the motor vehicle.

3. The wheel suspension element according to claim 1, wherein the two spring rods (3, 4) comprise a transition area (c) in the supporting structure (1) that is centrally located between the connection sides of the two spring rods and which is designed such that the two spring rods (3, 4) are stiffer in at least one of the spring compression and the spring decompression direction (z) than in a horizontal direction (x) which extends in the driving direction of the motor vehicle.

4. The wheel suspension element according to claim 1, wherein in the transition area (c) of the two spring rods (3, 4) in the supporting structure (1), an aspect ratio of the two spring rods (3, 4) has a continuous change.

5. The wheel suspension element according to claim 3, wherein the two spring rods extend from the transition area in the supporting structure parallel to each other and perpendicular to the driving direction of the motor vehicle, the supporting structure comprises a relatively stiff center area (c) for a connection to a bottom of a body of the motor vehicle and at least an additional form shape body carrier (6) for an outer connection to a longitudinal carrier of the motor vehicle body, beginning from the center area (c), and the center area at least partially overlaps the transition area.

6. The wheel suspension element according to claim 5, wherein the body carrier (6) is separately designed, within a fiber composite material, as an extrusion profile or as a steel profile.

7. The wheel suspension element according to claim 1, wherein the two spring rods (3, 4) and the supporting structure (1) have at least one continuous fiber layer and are formed from a same matrix material.

8. The wheel suspension element according to claim 1, wherein at least one rubber joint is integrated into the two spring rods (3, 4), either at a distal end area or at a connection area (3a, 3b, 4a, 4b) of the two spring rods (3, 4), and forms a rotationally elastic bearing of the wheel carrier (2).

9. The wheel suspension element according to claim 8, wherein the supporting structure (1) has at least one recess in which a polymer joint is located.

10. The wheel suspension element according to claim 8, wherein the supporting structure (1) has at least one of a bracket, a mounting part, and an insert for accommodating at least one of a cable harness, a brake hose and heat protection sheet metal.

11. The wheel suspension element according to claim 1, wherein the at two spring rods (3, 4) and the supporting structure (1) are manufactured during a common manufacturing step.

12. A wheel suspension element for a motor vehicle, the wheel suspension element comprising:

a supporting structure (1) for an axle, at least one rod as a guide of an articulated wheel carrier (2), the at least one rod connecting the wheel carrier (2) to the supporting structure (1), the supporting structure (1) being formed at least partially from a fiber composite material, the at least one rod being an elastic spring rod (3, 4) that is formed, from the fiber composite material, as one piece with the supporting structure (1), and an additional spring element is independent of the supporting structure (1) and the at least one spring rod (3, 4), the additional spring element is positioned between the at least one spring rod (3, 4) which is located at the connection side (a, b) of the wheel carrier (2), and the at least one spring rod (3, 4) is formed from the fiber composite material as one piece.

13. The wheel suspension element according to claim 12, wherein the additional spring element (5) comprises at least one bearing location (5c) in a transition area (c) of the at least one spring rod (3, 4) in the supporting structure (1).

14. The wheel suspension element according to claim 13, wherein the bearing location (5c) is defined as a pivot axis for the spring element (5) and is parallel to a driving direction of the motor vehicle.

15. The wheel suspension element according to claim 13, wherein a rubber joint is integrated into a distal end area (5a, 5b) of the spring element (5) as the rotationally elastic bearing of the wheel carrier (2).

16. A wheel suspension element for a motor vehicle, the wheel suspension element comprising:

a supporting structure for supporting an axle of the vehicle in a lateral direction that is perpendicular to a driving direction of the vehicle, elongate first and second rods, each of the first and the second rods has a central area and opposite remote ends, the central areas of the first and the second rods unite with the supporting structure such that the supporting structure and at least the central areas of the first and the second rods are formed as a unitary structure of a common material with the remote ends of the first and the second rods extending therefrom in the lateral direction, the first and the second rods are at least substantially parallel with respect to each other, and corresponding remote ends of the first and the second rods support articulated wheel carriers, the first and the second rods connecting the wheel carriers to the supporting structure, the supporting structure being formed at least partially from a fiber composite material, and the first and the second rods each being an elastic spring rod that is formed, from a fiber composite material, as one piece with the supporting structure.

17. The wheel suspension element according to claim 16, wherein the first and the second rods are parallel to each other in the lateral direction and spaced from each other in the driving direction by the supporting structure, and the first and the second spring rods are formed from the fiber composite material as one piece.

18. The wheel suspension element according to claim 16, wherein the remote ends of the first and the second spring rods comprise connection areas which facilitate connecting the wheel carrier, at the connection areas, each of the first and the second spring rods are more flexible in at least one of a spring compression and a spring decompression direction than in the lateral and the driving directions which are perpendicular to the at least one of the spring compression and the spring decompression direction.

* * * * *